US006991185B2

(12) United States Patent
Brown (10) Patent No.: US 6,991,185 B2
(45) Date of Patent: Jan. 31, 2006

(54) MULTI-COMPONENT FOAM DISPENSER WITH IMPROVED FLOW METERING MEANS

(75) Inventor: Daniel P. Brown, Palos Park, IL (US)

(73) Assignee: Flexible Products Company, Marietta, GA (US)

(*) Notice: Subject to any disclaimer, the term of this patent is extended or adjusted under 35 U.S.C. 154(b) by 127 days.

(21) Appl. No.: 10/318,942

(22) Filed: Dec. 13, 2002

(65) Prior Publication Data
US 2003/0116647 A1    Jun. 26, 2003

Related U.S. Application Data

(63) Continuation of application No. 09/706,935, filed on Nov. 6, 2000, now abandoned.

(51) Int. Cl.
*F23D 11/46* (2006.01)
(52) U.S. Cl. ............... 239/414; 239/416; 239/527; 239/581.1
(58) Field of Classification Search .............. 239/414, 239/416, 417.5, 432, 527, 528, 581.1, 407

See application file for complete search history.

(56) References Cited

U.S. PATENT DOCUMENTS

| 953,511 A | 3/1910 | Brooks |
|---|---|---|
| 3,305,211 A | 2/1967 | Phillips |
| 3,900,163 A * | 8/1975 | Volker ................. 239/414 |
| 4,653,691 A * | 3/1987 | Grime ................. 239/416 |
| 4,676,437 A * | 6/1987 | Brown ................. 239/414 |
| 4,925,107 A * | 5/1990 | Brown ................. 239/527 |
| 5,009,342 A | 4/1991 | Lawrence et al. |
| 5,529,245 A | 6/1996 | Brown |
| 5,944,259 A | 8/1999 | Brown |

* cited by examiner

*Primary Examiner*—Steven J. Ganey
(74) *Attorney, Agent, or Firm*—Vedder Price Kaufman & Kammholz

(57) ABSTRACT

An improved metering apparatus is provided for use with a foam dispenser that disperses beads of foam after mixing streams of two foam components together. The dispenser has a pair of seal passages formed in a body portion of the dispenser and a spool valve rotated mounted in the body portion. The spool valve has a pair of flow passages formed in it that can be rotated into mating alignment with the seal passages formed in the dispenser body. The spool valve flow passages have circular cross-sections while the seal passages have non-circular cross-sections, and preferably triangular cross-sections.

18 Claims, 6 Drawing Sheets

MULTI-COMPONENT FOAM DISPENSER WITH IMPROVED FLOW METERING MEANS

This is a continuation of prior application Ser. No. 09/706,935, filed Nov. 6, 2000, which is hereby incorporated herein by reference in its entirety.

BACKGROUND OF THE INVENTION

The present invention relates generally to mixing and dispensing apparatus used in the polyurethane foam industry, and move particularly to a novel means for metering on ratio the flow of foam components through the dispenser.

The use of urethane foams is commonplace in the building industry. Urethane foams are used as adhesives, as insulation material, as roofing components, etc. Most urethane foams used in these applications are the reaction product of two individual components, one being an "A" or isocyanate component and the other being a "B", or resin component. These components are mixed together to typically form an expansive foam.

In operation, separate containers of the A and B components are used in conjunction with a dispensing gun in which the flow of each of the A and B components is controlled as they pass through the dispensing gun into a mixing and discharge nozzle. U.S. Pat. No. 5,529,245, issued Jun. 25, 1996 and U.S. Pat. No. 5,944,259, issued Aug. 31, 1999 to the assignee of the present invention describe two constructions of foam-component dispensing guns.

In each such construction, the gun has a body portion that at a rear end portion thereof, receives and which houses two inlets connectable to the foam component supply containers. The gun body also contains a mixing and discharge nozzle at a front end thereof. A rotatable spool valve is rotatably mounted in the gun body and has two passages formed in a body portion which provide two pathways between the inlets and the nozzle for mixing and discharge. This valve is rotated when the trigger of the gun is moved toward the gun handle.

This rotation brings the two valve passages into alignment with passages formed in both the mixing and discharge nozzle and the inlets. All of the passages in these known dispensing guns are circular in cross-section. Metering of the foam components discharged through the nozzle is achieved by slowly depressing the trigger and moving it toward the handle. Although this action produces adequate results, it is still difficult to obtain low-flow dispensing of the foam components that might be obtained using a needle valve.

In order to provide foam dispensers that accurately meter and dispense foam at low flow conditions, the industry has utilized needle valves for controlling the flow. In a typical needle valve, a needle is held within a bore and in moved in and out of the passage by means of a moveable stem mounting in order to adjust the size of the annular passage that is formed between the needle and the bore.

Needle valves work very well for controlling the flow of a single stream of a liquid or a gas. It is difficult, however, to couple together the adjustment of two needle valves on two streams of liquid/gas so that an exact ratio between the two streams is obtained. In order to do so, each stream must be activated simultaneously with a consistent rate of change and at similar degrees over the opening and closing of the valves. The viscous and highly reactive nature of the foam components, particularly the isocyanate component, causes the needle to often stick in its bore, necessitating frequent disassembly and cleaning and/or replacement of the needles or even replacement of the entire dispenser. It is also difficult to tie the two needles of the needle valve together in a manner so that movement of one needle effects a similar movement of the other needle to obtain the needed ratio.

Also, the phenomena of "lead lag" has been noted in the use of foam dispensers that use needle valves. These occur at low-flow conditions when one of the two needles unseat ahead or after the other when this occurs, it creates an "off-ratio" situation where the amount of one flow component does not match the desired amount that must combine with another desired amount of the other flow component. As such, the desired ratio of the two reactive foam components is not met, thereby resulting off-ratio foam in which the two reactive components do not completely combine. This lead lag is also affected by the viscosities of the foam components, and the rate and velocity of the flow. This is caused by the aforementioned inability to effectively tie the two needles together so that precise seating and unseating of the needles will occur.

The present invention is therefore directed to a dispensing apparatus with an improved flow metering assembly that overcomes the aforementioned disadvantages.

SUMMARY OF THE INVENTION

Accordingly, it is a general object of the present invention to provide a foam component dispensing gun that accurately dispenses foam at low flow conditions comparable to that obtained using a needle valve.

Another object of the present invention is to provide an improved dispensing gun for the dispensing of fluids that uses a spool valve rotatably mounted in the body of the gun and in which the gun body includes pairs of aligned, but dissimilar flow passages in a horizontal orientation that provide accurate metering of fluid components at low flows, particularly polyurethane foam components.

Yet still another object of the present invention is to provide a fluid dispensing apparatus which dispenses streams of two distinct fluids, typically reactive, polyurethane foam components, in which the apparatus utilizes geometric passage means for controlling the ratio and flow of the two fluids.

Still another object of the present invention is to provide a multiple fluid component dispenser having a body portion with a spool valve rotatably mounted therein, the spool valve having a pair of cylindrical passages formed therein for the passage of fluid components there through, and the gun body having a pair of inlet passages formed therein and terminating at seals adjacent the spool valve, the seals being aligned with two inlet connections so that rotation of the spool valve brings the spool valve passages into alignment and communication with the dispenser body seals, wherein the dispenser body seals have a different shape than the cylindrical spool valve passages, the different shapes providing a more restricted passage volume at low flow conditions to more effectively meter foam components.

A further object of the present invention is to provide a foam dispensing gun with a more accurate low-flow metering capability than presently available, the gun having a body portion with a pair of non-circular cross-section foam component seal passages formed therein in the sidewall defining the seat, the gun body further having a spool valve rotatably mounted therein, including a pair of circular cross-section passages, the non-circular cross-section seal passages having a profile with a narrow leading edge portion that expands to a baseline thereby increasing the cross-sectional area of the intersection formed at the interface between the dispenser seal passages and spool valve passages through which the foam components may pass.

A still further object of the present invention is to provide an improved foam dispenser having a body portion in which a spool valve is rotatably mounted, a trigger engaging the spool valve for rotating the spool valve within the dispenser body portion, the spool valve having two distinct foam component flow passages formed therein, and the dispenser body portion having a pair of seal passages formed in the dispenser body valve seat wall for mating with the spool valve passages wherein the improvement includes the dispenser body seal passages being formed with non-circular cross-sections, each such seal passage cross-section having a narrow initial throat portion that opens up to a wide base portion, the initial throat portions of the seal passages being oriented in opposition to the direction of rotation of the spool valve so that the seal passage throat portions first intersect and communicate with the spool valve passages at low flow positions of the dispenser.

The present invention accomplishes these and other objects through its unique and novel structure. In this regard and in one principal aspect of the present invention, as exemplified by one embodiment of the invention, the fluid dispensing apparatus may take the form of a gun with a cylindrical body portion. A pair of material inlet connections are set within the body portion and have openings formed therein that provide a means for connecting two supplies of separate foam components to the dispensing apparatus. The dispensing apparatus also may have a mixing and discharge nozzle that removably engages the body portion. The nozzle also has two inlets communicating with the body portion. A spool valve is rotatably mounted within a valve seat cavity formed in the body portion defined by a sidewall and is interposed between the nozzle inlets and seal passages defined in the valve seat wall which are in communication with the material inlet connections. The spool valve has a pair of internal cylindrical foam component flow passages formed therein, while two communicating seal passages are formed in sidewall that defines the valve seat cavity in which the spool valve rotates. Geometry is utilized so that the spool valve passages are formed with cross-sections that are different than the cross-sections of the passages defined in the sidewall.

In another principal aspect of the invention, the cross-sections of the seal passages have a non-circular cross-section and preferably take the shape of a polygon, such as a triangle or a trapezoid. These polygonal shapes have at least two interior corners and have a cross-sectional area that increases from a leading edge of the seal passages to common baselines of the seal passages in a direction that is the same as the direction of rotation of the spool valve. By this relationship, the spool valve passages will intersect with the seal passages at their narrow portions first to give the necessary control at low flow conditions. Both the spool valve passages and the seal passages are aligned with each other such that the open area defined by the intersection of the spool valve passages and the seal passages is identical and increases in the same incremental manner for both passages.

The cross-sections of the dispenser seal passages take the shapes of polygons, such as triangles, trapezoids or the like that have a narrow portion that leads to a wider portion. These shapes all include at least two interior corners that at least partially define the shape of the cross-section. The sizes of each of the seal passages are equal so that the rate of change of intersection of the passages will be the same for each fluid component passage, thereby keeping the entire system on ratio throughout the full range of motion of the activating trigger of the dispensing apparatus.

These and other objects, features and advantages of the present invention will be clearly understood through consideration of the following detailed description.

BRIEF DESCRIPTION OF THE DRAWINGS

The detailed description particularly refers to the accompanying figures in which:

FIG. 6A is an enlarged sectional detail view illustrating the interface between the spool valve flow passages and the dispenser body inlet passages at an initial mating position there between;

DETAILED DESCRIPTION OF THE PREFERRED EMBODIMENTS

While the advantages of the invention may be achieved and practiced by the use of other structures, a preferred embodiment of the invention is of the type shown, wherein the gun assembly is made principally from plastic material and includes the various structural and functional features to be described here in detail.

Figure 1:
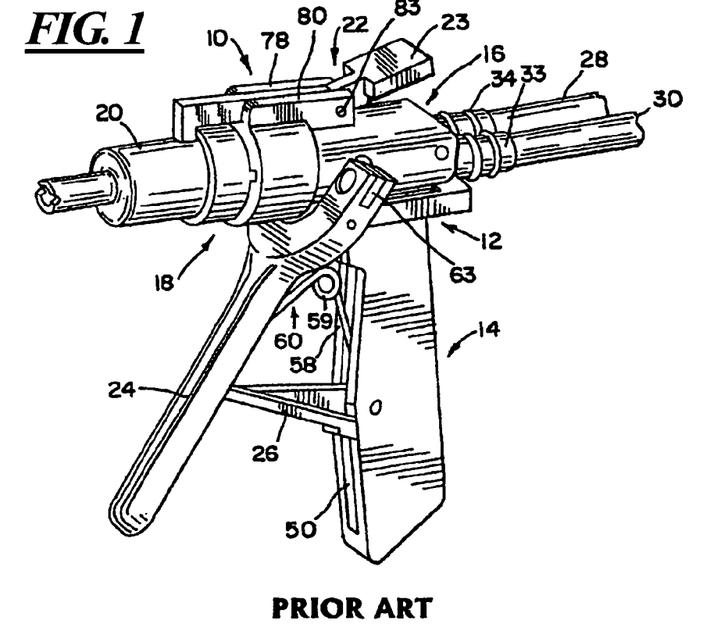
FIG. 1 is a perspective view of a known dispensing gun used to mix foam components and dispense the mixed components as a foam.

FIG. 1 illustrates generally at 10, a hand-held dispenser that is used to dispense a foam formed from two distinct foam components. The structure of this dispenser 10 is described in U.S. Pat. No. 4,676,437, issued Jun. 20, 1987, U.S. Pat No. 5,529,245, issued Jun. 25, 1996 and U.S. Pat. No. 5,944,259, issued Aug. 31, 1999, all of which are assigned to the assignee of the present invention and are incorporated herein by reference.

The gun assembly 10 is shown to include a number of principal components, including a gun body generally designated 12 and shown to be subdivided into a handle generally designated 14, a component passage and gun body flow control valve housing 16, a nozzle receiver assembly 18, a removable nozzle 20, a combination nozzle latch and ejector element 22, a trigger assembly 24, a trigger safety 26, and first and second component inlet hoses 28, 30, each terminating in forward fittings 31, 33.

The trigger assembly 24 is connected to the valve housing 16 and is movable toward the handle 14. Movement of the trigger 24 toward the handle 14 brings a pair of passages (not shown in FIG. 1 but described in detail below) that are formed in a spool valve mounted for rotation within a cavity of the valve housing 16 into alignment with line passages that are formed in the valve housing 16. In the prior art, the cross-section of the passages in the spool valve and the valve housing 16 are both circular in cross-section. When the spool valve is rotated by the trigger 24 in a counter clockwise direction, the top portions of the spool valve passages initially intersect with the lower portions of the valve housing passages to form an oral cross-section. This oval grows in size until the two circular passages are completely aligned in registry.

The initial intersection of these two passages is used for the dispensing of foam components at low flow conditions. It is hard to accurately meter small amounts of foam components to lay down small diameter beads of expanding foam. Such small beads are capable of being dispensed with accuracy when a needle valve is used. A needle valve must be constantly cleaned because the mixed foam passes through it and costs significantly more than the spool valve configuration 65 of the dispenser 10 shown. As mentioned above, needle valves are hard to adjust precisely at low-flow conditions to deliver foam components on ratio at low flows. The undesirable lead lag phenomena occurs where the movement of one needle is ahead of or behind the other needle. Although generally effective in operation, the circular cross-sections of these two passages have been discovered not to have a sufficiently small enough surface area to effectively control the amount of foam components through the dispenser at low flows.

The present invention is thus directed to an improved means for metering the low flow of foam components in dispensers of the type shown in FIG. 1.

Figure 2:
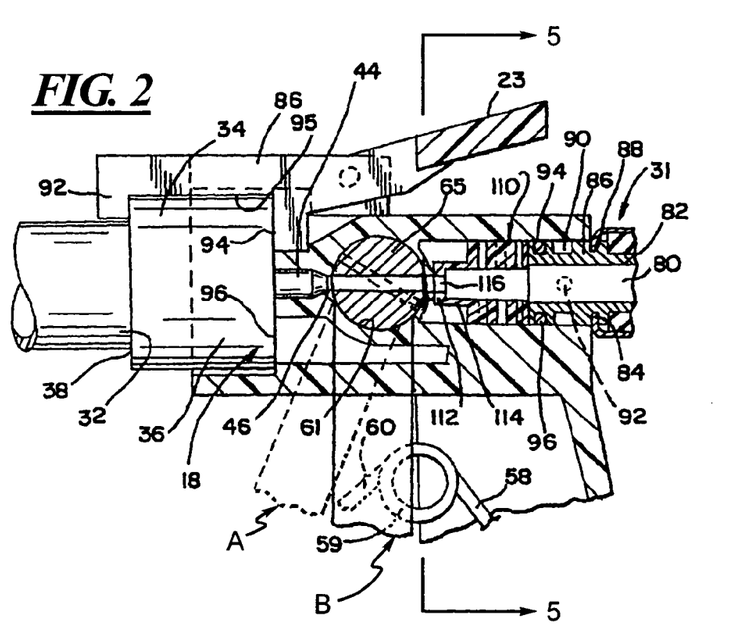
FIG. 2 is a sectional view of a body portion of the dispenser of FIG. 1 incorporating the principles of the present invention and illustrating the alignment and mating of the foam component passages after movement of the dispenser trigger from position A to position B.

Referring now to FIG. 2, it is shown that the nozzle assembly generally designated 20 includes a cylindrical, reduced diameter main mixing body portion 32, an enlarged diameter seating body portion 34 having a cylindrical exterior registration and alignment surface 36, which includes a forwardly directed, radially extending annular latch-engaging surface 38. At its axially inner (toward the gun body) end portions a pair of nipples 44 (only one shown for clarity) are provided, each of which is adapted to seat within outlet passages 46 in the gun body.

The gun body 12 includes the handle 14 just referred to and this part, in turn, includes a vertically extending slot 50 adapted to receive a part of the trigger safety 26 when the safety is in a folded position. The slot 50 also provides a convenient receptacle for one leg 58 of a trigger return spring generally designated 60 and shown to be of the "clothespin" or hairpin type, operating in response to torsional forces generated in its center coil 59.

The upper portion of the gun body 12 includes as a major element, a product flow control valve housing 16 having the components referred to in detail elsewhere herein, and also shown to include spool receiving means in the form of generally circular sidewalls 61 defining a cylindrical bore or passage 62 extending transversely to the principal axis of the housing 16. The trigger operates ears 63 on the spool 65, bringing the central spool passage 67 into and out of alignment with the product flow passages 46, 69.

Figure 3:
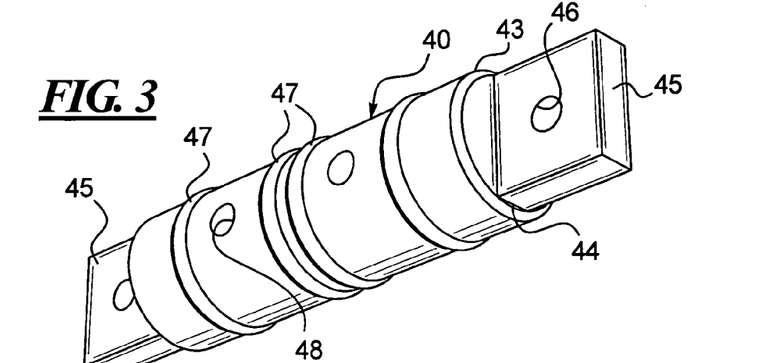
FIG. 3 is a perspective view of a rotatable spool valve used in the dispenser of FIG. 2.

The spool valve 65 is shown by itself in FIG. 3. It has a cylindrical body portion 143 with a pair of ears 63 formed therewith that project outwardly from the ends 144 of the body portion 143. These ears 63 are plate-like in nature so that they may conveniently fit within a pair of slots that are formed in the arms of the trigger. The ears 63 may include holes 146 disposed therein that provide a means for reliably securing the trigger to the spool valve 65. This securement may be effected by screws, or other suitable fasteners.

As described in the aforementioned patents, the spool valve 65 may further include in its body portion a series of channels 147 that receive O-rings or any other sealing member to provide a seal within the valve seat to hold the spool valve 65 in place in the body portion and to prevent any foam components passing through it from exiting out the sides of the seat.

In order to provide a path for foam components through the dispenser, the spool valve 65 preferably has a pair of flow passages 148 formed in the solid parts of the body portion 143 that lie between the O-ring grooves or channels 147. This solid portion acts as a mating surface valve body to engage against the seal of the dispenser body portion. These flow passages 148 are fixed with respect to the ears 63 so they are moved when the trigger is moved back and forth in its movement toward and away from the dispenser handle. This movement is selectively controlled by the user when the trigger is grasped. This movement is intended to bring the spool valve flow passages 48 into alignment and communication with the seal passages that are formed in the dispenser body 16.

Referring again to FIG. 2, surmounting the housing 16 is a combination nozzle latch and ejector element receiver generally designated 22 and shown to include generally parallel or slightly tapering spaced apart sidewalls 78, 80 designed to snugly engage the ejector when it is in the locked position, and each of which includes an identical small opening 83 for receiving the pivot ears (now shown) forming a part of the nozzle latching and ejector element.

This unit 22 in turn is shown to comprise a rockerstyle lever assembly having a finger tab 23 lying to one side of the pivot ears and a generally horizontal latching leg 86. The end portion of the latching leg terminates in a claw 92, while the front face 94 of an ejector leg acts to engage the rear face of the nozzle, for expulsion thereof in the raised position. The latch and ejector receiver has its sidewalls 78, 80 spaced closely enough apart that these walls snugly engages the leg 86 of the latching and ejector element 22, preventing it from moving too freely and helping retain the nozzle 20 in place.

The nozzle receiver assembly 18 is disposed at the forward end of the housing 16 and includes a radially inwardly facing cylindrical nozzle guide surface 94 terminating at its inner end in a front wall portion.

Referring now to the inlet passage 81 and the nipple generally designated 31, it will be seen that the insert portion 82 of the hose is crimped by a metal portion 84 into a groove 88 in a fitting generally designated 86. Another groove 90 is provided to receive a set screw 93. Finally, the fitting 86 includes a forwardmost groove 94 for accommodating an O-ring 96.

The composite fitting 86 bears on a force-applying element generally designated 110 and shown to include a radial flange 112 and an axial flange 114 defining an open passage 116 for product.

Figure 4A:
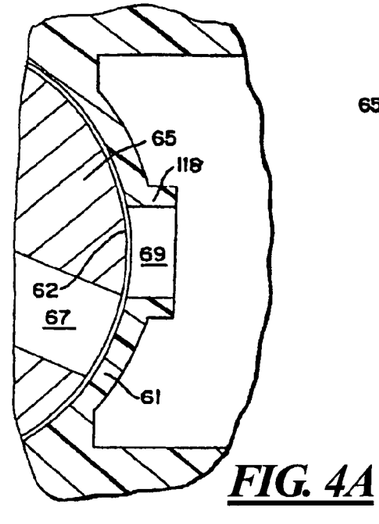
FIG. 4A is an enlarged view of the body portion of FIG. 2 showing the flexible wall of the gun body of the invention, and with the spool in the "off" position and the force-applying unit absent.
Figure 4B:
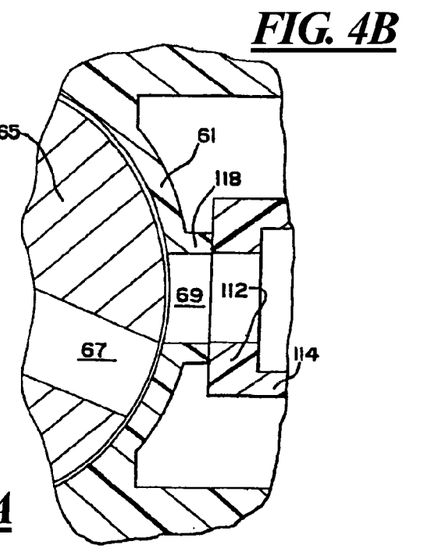
FIG. 4B is a view similar to FIG. 4A, and showing the force-applying component in position but not under load.
Figures 4C, 5:
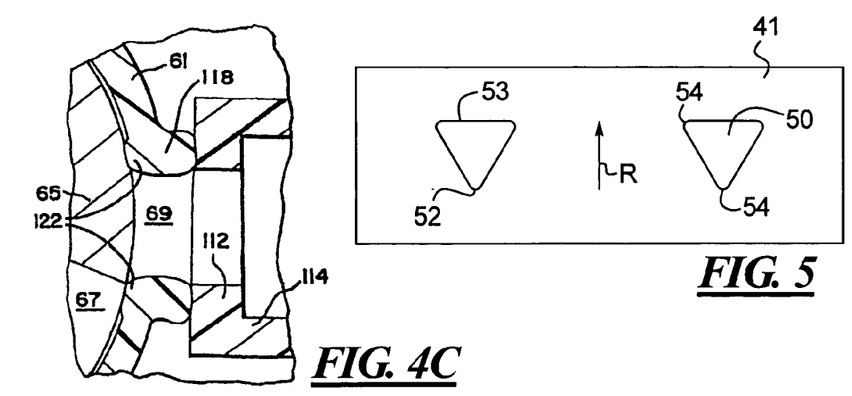
FIG. 4C is a view showing the wall surrounding the opening being deflected into position by the force-applying component.
FIG. 5 is a diagrammatic sectional view of the dispenser body portion of FIG. 2 taken generally along lines 5—5 thereof.

When the fitting exerts the force on the seat, the seat deflects in a regular pattern. Thus, and referring to FIG. 4A with the clearances exaggerated for clarity, a greatly enlarged version of the spool 65, the sidewall 61, and the passages 67, 69. The wall 61 also includes an extension 118 I the form of a stub cylinder. As shown in FIG. 4B, when the force-applying element 110 is placed in the application, the radial flange 112 and the axial flange 114 are ready to bear upon the stub cylinder 118 but have not done so. At this point, again with clearances greatly exaggerated for clarity, there is a very small clearance space between the wall 61 and the spool 65, and particularly, the opening 67 in the spool. However, as force is applied, as shown in FIG. 4C, the radial flange 112 and the axial flange 114 of the force-applying element in effect, deflect the cylinder 118, and its imaginary extension, so that portions thereof 122 adjacent the spool valve deflect into contract with the spool valve, and other portions adjacent the radial flange 112 deflect somewhat both radially inwardly and outwardly. A detail of the deformation, and the extent to which it takes place, is shown somewhat schematically in FIG. 4C.

In the alternative, in place of the unit 110, a plurality of Belleville washers (not shown) could be arranged in front-to-back relation. Other spring arrangements with a relatively high constraint could be used. The arrangement shown is illustrative but not exhaustive.

In this position, in effect, a virtual O-ring is created about the sealed area. However, the advantage of this arrangement is that the bulge or deflection of the sidewall is only in an area about the stub cylinder, which is difficult to seal. The shape of the arrangement with the cylinder pushing on the spool, in effect, creates dimensions such that the cylindrical surface of the sealing ring is completely sealed with loss of effectiveness.

Otherwise, an O-ring would require a seat of a somewhat cylindrical configuration. In the alternative, it would be necessary to force the sidewall into a more snug engagement with the spool. In the way of the invention, a very effective seal is created, yet a great deal of force is not necessary to overcome the resistance of the seal.

As noted above, the dispenser 10 includes a pair of inlet passages 81. Also formed in the value housing 16 are seal passages 69 that extend through the sidewall 61 for communication with the spool valve passages 67. The spool valve flow passages 67 are aligned in registry with seal passages 69 after the trigger 29 is moved from position A to position B. When so aligned, a flow path is cooperatively defined through the valve housing 16 and the spool valve 65. This flow path is extended by way of a pair of nipples 44 that are formed in the valve housing 16 forward or downstream of the spool valve 65. Hence, it will be understood that movement of the trigger 24 brings the spool valve flow passages 67 into communication with the two passages 44 and 69.

As stated above, it has been discovered that known dispensers that use passages having circular cross-sections throughout the dispenser do not provide effective metering of the dispensing of the foam components at low flow conditions where the user desires to lay down beads of foam of reduced size. The present invention offers a solution to this problem and does so by making the foam passages in the seal and spool valve 69, 67 different. This "difference" refers to the cross-section of the passages. The present invention utilizes, in one exemplary embodiment, spool valve flow passages 67 that are circular or cylindrical and which may be easily formed such as by drilling, and dispenser body portion seal passages 69 that are non-circular. In the first preferred embodiment, and illustrated in FIG. 5, these passages 69 have a general triangular cross-section, with each such passage 69 having an initial apex portion 52 that widens to a base portion 53. The triangular cross-sections have multiple interior corners 54 at locations where the sides of the cross-section meet.

Figure 6A:
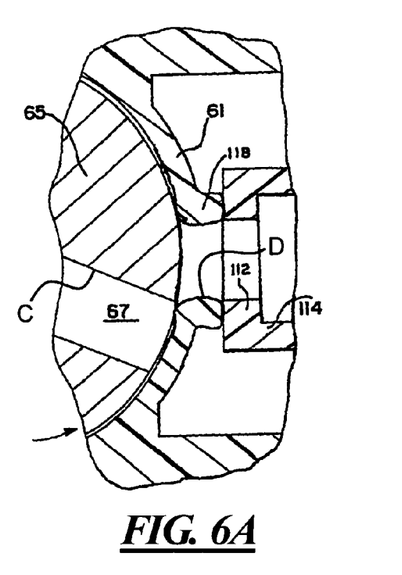

The non-circular cross-sections are most easily formed in the dispenser value housing 16 sidewalls 61 during the injection molding thereof. Such cross-sections may also be formed in the spool valve body portion 65, but such forming would have to be done by way of swaging, cold-forming or EDM (electro-discharge machining), all of which are more expensive and complicated than simple drilling.

Where the user desires to lay down a small bead of foam at low-flow conditions, the user squeezes the trigger 24 in an incremental manner so that the two-flow passages 67, 69 make just one initial alignment contact, such as illustrated in FIG. 6A. The spool valve 65 rotates in a counterclockwise manner toward the handle so that the top edges "C" of the spool valve flow passages 67 will near and communicate with the lower edge "D" of the body portion seal passages 69. Such an initial communication is shown in FIG. 6A in section and in superimposition in FIG. 7A at 6A. It can be seen in FIGS. 5 and 7B that with a triangular cross-sections, the area of the seal passage 69 increases in the direction of rotation of the spool valve 65, indicated by the arrows R in FIGS. 5 and 6A–C.

Figure 7A:
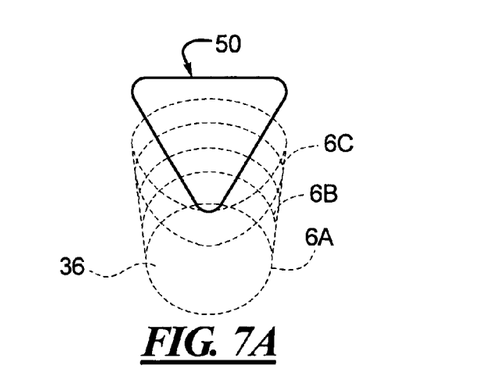
FIG. 7A is a diagrammatic view illustrating the sequential intersections of the spool valve inlet passage (shown in broken line) and the dispenser body portion inlet passage (shown in solid lines) which correspond generally to the positions illustrated in FIGS. 6A–6C.
Figure 7B:
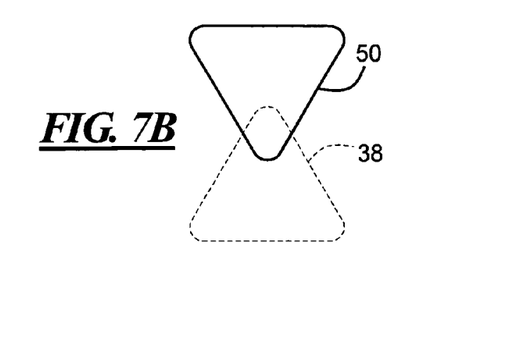
FIG. 7B is a similar diagrammatic view, but showing the use and intersection of two triangular orifices.

The use of cross-sections for the seal passages 69 that are different than the cross-sections of the spool valve flow passages 67 significantly decreases the surface area available at their intersection available for the foam components to pass through, thereby improving the foam metering function of the dispenser 10 at low-flow conditions without losing the higher end of the flow range. When a triangular cross-section, as shown in FIGS. 5, 7A and 7B, is used, the initial flow is controlled by the intersection of the two passages and particularly by the tip of the triangle. As the trigger is depressed further so that the spool valve 65 rotates and the spool valve flow passages 67 are brought into phase or alignment with the body portion seal passages 69, the surface area of the seal passages of the triangle that intersects with that of the circle of the spool valve flow passages increases to increase the flow. Further depression of the trigger results in full registration between the circular cross-section (or orifice) of the spool valve flow passage 67 and the full triangular cross-section (or orifice) of the body portion seal passages 69.

Figure 6B:
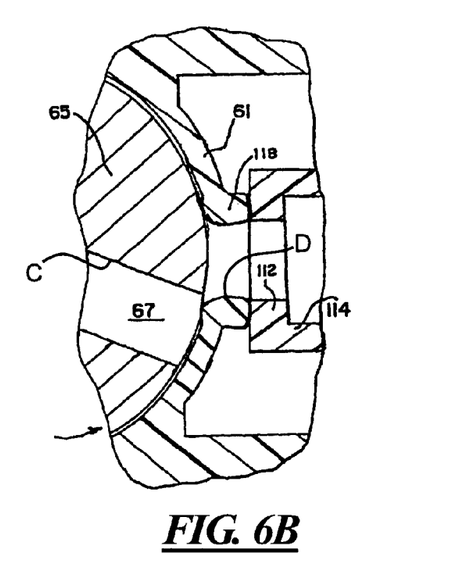
FIG. 6B is the same view as FIG. 6A but with the spool valve rotated incrementally counterclockwise to increase the amount of area of the spool valve flow passages that mate with the dispenser body inlet passages.
Figure 6C:
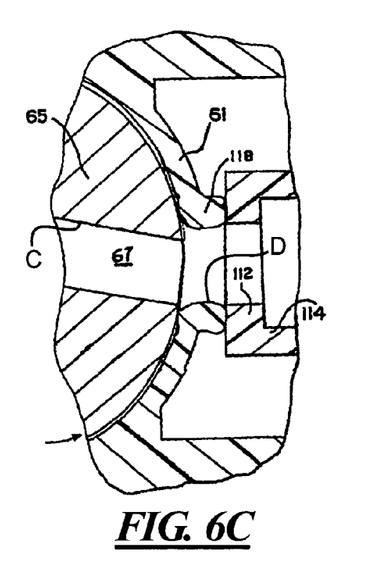
FIG. 6C is the same view as FIG. 6B, but with the spool valve further incrementally rotated counterclockwise.

It is important to note that the desired flow characteristics can be raised by varying the baseline 53 of the triangle. Increasing the baseline 53 will permit one to accommodate larger flow rates. The triangular orifice 69 may be molded into the valve housing 16 sidewall 61 of the dispenser 10. The relationship that occurs between the two orifices when a triangular shape is used is diagrammatically illustrated in FIG. 7A where the triangular orifice 69 is illustrated in solid line and the movement of the circular orifice of the spool valve flow passage 67 is illustrated in broken lines. The broken circles that correspond approximately to the positions shown in cross-section in FIGS. 6A–6C are labeled "6A", "6B" and "6C" in FIG. 7A.

Figure 8:
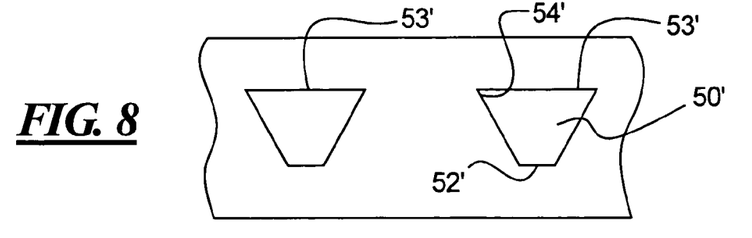
FIG. 8 is a diagrammatic sectional view of the dispenser body portion illustrating another configuration of the dispenser body inlet passages.

FIG. 8 illustrates another suitable cross-section and configuration that is believed to be similarly useful as the triangular one previously discussed. In FIG. 8, the seal passage 69' is formed as a trapezoid, having two parallel sides that are connected by two non-parallel sides. In this instance, the cross-section is polygonal, having at least four interior corners 54' and having a width (and hence, surface area) that increases from its narrow leading edge 52' to its widest point at its baseline 53'. It will be understood that the interior corners may be sharp corners that terminate in a point or dull corners that have a slightly blunt, or rounded profile.

Figure 9:
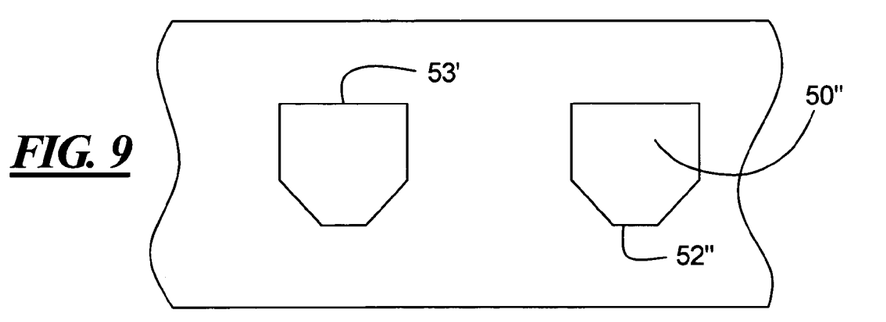
FIG. 9 is a diagrammatic sectional view of the dispenser body portion illustrating another configuration of the dispenser body inlet passages.
Figure 10:
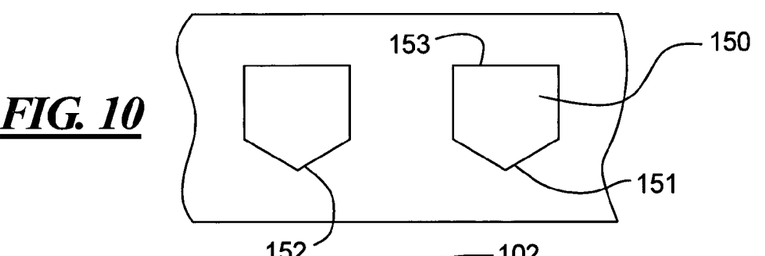
FIG. 10 is a diagrammatic sectional view of the dispenser body portion illustrating another configuration of the dispenser body inlet passages.

FIG. 9 illustrates another embodiment wherein the seal passage orifice 69" is six-sided polygon, also with a leading edge 52" that is narrower than the baseline portion 53" thereof. Likewise, FIG. 10 illustrates yet another embodiment wherein the seal passage orifice 169 is a five-sided polygon having an apex 151 at its leading edge 152 and a width that partially increases as it extends toward a baseline 153 of the seal orifice 150.

Figure 11:
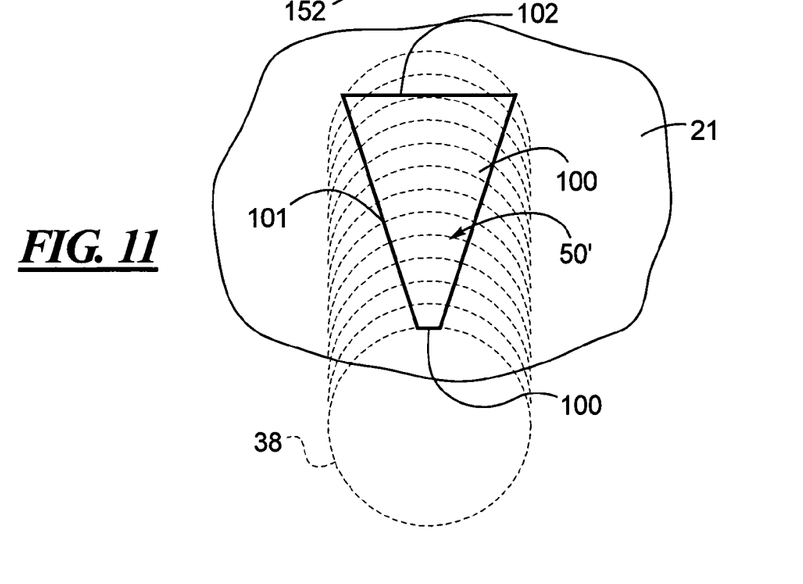
FIG. 11 is another diagrammatic view illustrating the superimposition of incremental advancements of a spool valve flow passage on an inlet passage.

FIG. 11 illustrates the successive intersection of the circular orifices of the spool valve flow passages with a trapezoidal or "pie-shaped" seal orifice 69' that is formed in the dispenser value housing 16 sidewalls 61. The seal orifice 69' has a narrow leading edge 100 that acts as an apex of the seal orifice. This leading edge 100 defines the initial width of the seal orifice 69' that is met by the circular flow passages 67 of the spool valve which move from the seal orifice leading edge 100 to orifice baseline 102 that has a greater width than that of the leading edge 100. Two side walls 101 of the seal orifice extend at an angle from the leading edge 100 to the baseline 102 and at outward angles so that as the spool valve and its corresponding flow passages 67 are rotated within the recess. The spool valve passages are incrementally moved into intersection with the seal orifice outlet '69. FIG. 11 illustrates each incremental increase in the surface area of spool valve flow passage—seal orifice outlet passage intersection. Suitable results have been obtained with seal orifices having leading edges of about 0.010 inches, baselines of about 0.063 inches and separated by a distance of about 0.086 inches. Such dimensions give an overall area of the inlet passage of about 0.030 square inches.

The narrow leading edge of the seal orifice results in good metering capability at low-flow conditions, while the board baseline of the seal orifice results in full flow and output when spool valve flow passage circular orifice completely overlies the seal orifice passage 69.

Similar results may be obtained by using, as illustrated in FIG. 7B, a triangular cross-section 67' for the spool valve passage orifice. This will increase the expense of the dispenser, in that such a cross-section must be swaged, cold formed, etc. rather than simply drilled.

Figure 12:
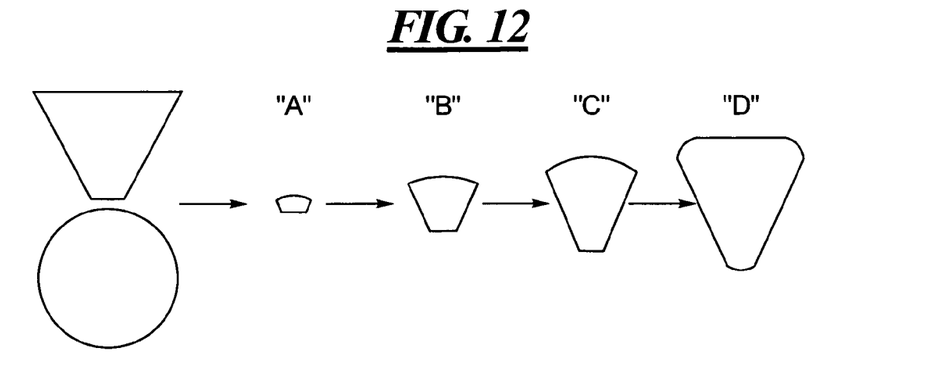
FIG. 12 is a diagrammatic view of an alternate arrangement of two different cross-sectional passages used with the invention,, illustrating the two passages and the progressive intersection thereof.

FIGS. 12–15 illustrate, schematically, different intersecting cross-section flow passages and the increasing cross-section area resulting from incrementally advancing one geometric passage upon the other. In FIG. 12, the passages are circular and triangular which result in areas from about 0.001 square inches in "A" to about 0.0032 square inches in "D".

Figure 13:
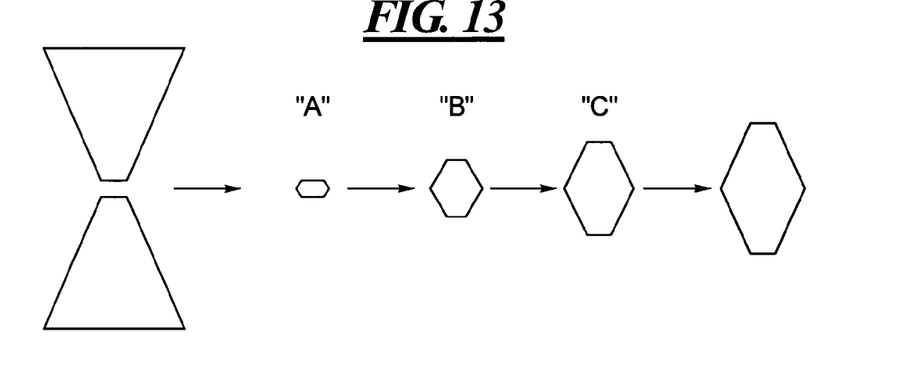
FIG. 13 is a diagrammatic view of another alternate arrangement of two different cross-sectional passages used with the invention, illustrating the two passages and the progressive intersection thereof.

In FIG. 13, both passages have trapezoidal style passages which yield an area of about 0.0001 square inches as shown in "A" where the two passages are just initially intersecting to about 0.0023 square inches in "D" where the two passages are fully intersected with each other.

Figure 14:
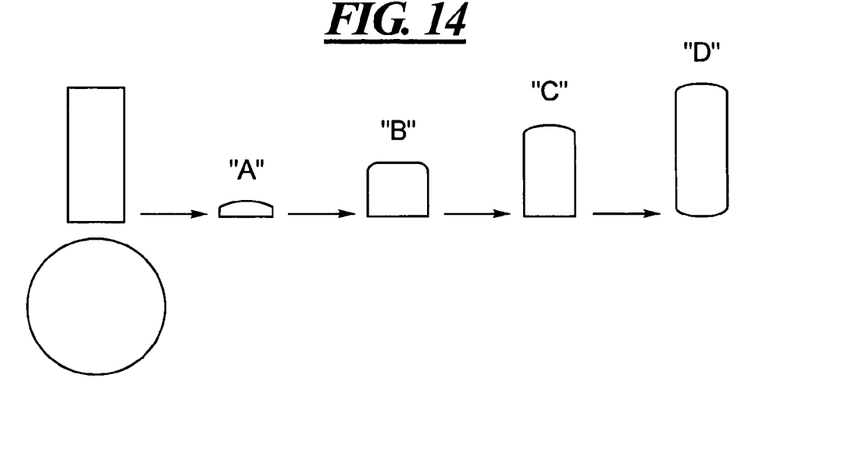
FIG. 14 is a diagrammatic view of a third alternate arrangement of two different cross-sectional passages used with the invention, illustrating the two passages and the progressive intersection thereof.

In FIG. 14, one passage is circular while the other is rectangular. This combination yields an initial area of about 0.0002 square inches at "A" to about 0.0024 square inches at "D" where the two passages are fully intersected.

Figure 15:
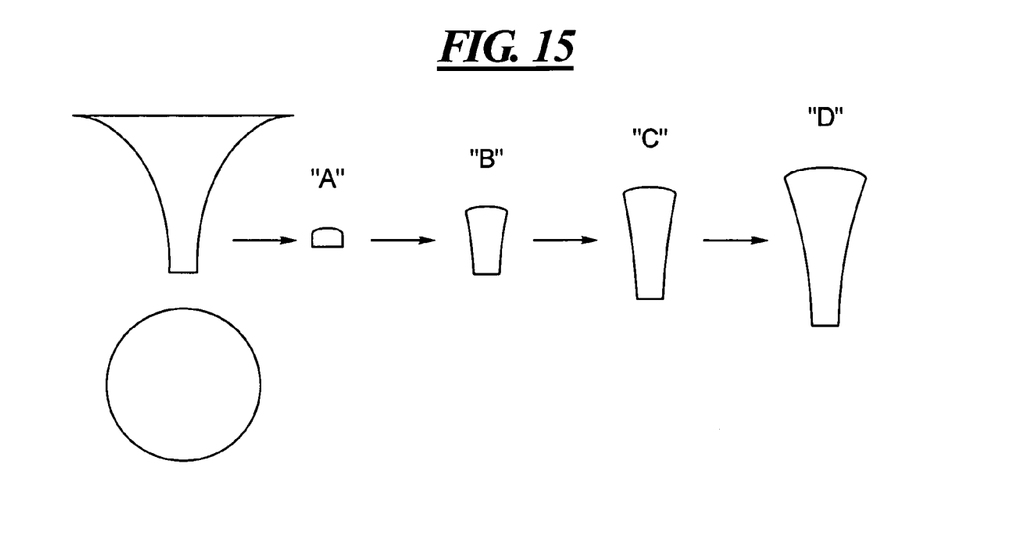
FIG. 15 is a diagrammatic view of a fourth alternate arrangement of two different cross-sectional passages used with the invention, illustrating the two passages and the progressive intersection thereof.

Lastly, FIG. 15 illustrates the use of a circular passage and a "horn" like passage that yield an initial intersection of about 0.0001 square inches at "A" to about 0.0018 square inches at full intersection at "D". With the use of a horn-like passage shown in "D" of FIG. 15, the rate of increase in the flow may be calculated to expand in a non-linear fashion, in contrast to the linear increase experienced with the other embodiments.

Figure 16:
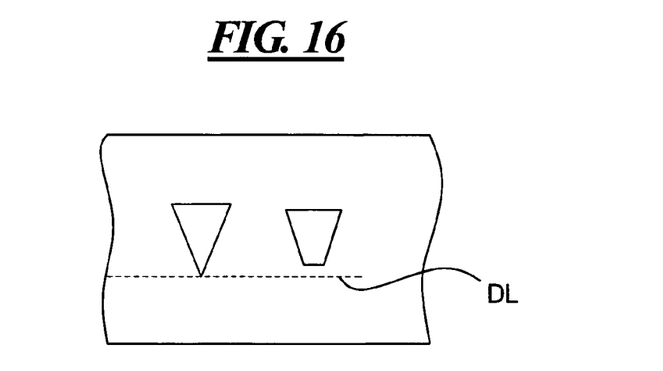
FIG. 16 is a schematic view of the seal of the dispenser body portion illustrating an offset arrangement of flow passages.

Additionally, as shown in FIG. 16, two different passage shapes may be formed in the seal portion of the dispenser body, as well as offset from a datum line "DL" in order to permit the adjustment of the flow rates of dissimilar materials, as opposed to their alignment of a common datum line as illustrated in the other embodiments.

Although the detailed description has been given in terms of using two reactive foam components as the fluids dispensed by the apparatus, it will be understood that the present invention may be utilized in other fluid applications and that the orientation of the spool valve may be other than horizontal.

While the preferred embodiments of the invention have been shown and described, it will be apparent to those skilled in the art that changes and modifications may be made therein without departing from the spirit of the invention, the scope of which is defined by the appended claims.

What is claimed is:

1. A foam dispensing gun for dispensing a stream of foam formed by reacting two streams of foam components together, the gun comprising: a body portion, a handle depending from the body portion, a trigger for actuating said gun, a nozzle for dispensing said formed foam from said gun;

said body portion including an integrally molded valve seat extending transversely therethrough, the valve seat including integrally molded seal passages formed therein and oriented transverse thereto, a spool valve capable of rotation disposed in said valve seat, the spool valve having a pair of flow passages extending therethrough; the spool valve operatively engaging said trigger such that movement of said trigger rotates said spool valve within said valve seat;

said body portion further including a pair of inlet passages defined therein that extend longitudinally there through generally parallel to a longitudinal axis of said gun, whereby said trigger may be selectively moved to rotate said spool valve and bring said spool valve flow passages into communication with said seal passages to thereby define a path for foam components to flow through said spool valve to said nozzle;

said spool valve flow passages and said seal passages having non-circular cross-sections.

2. The foam dispensing gun of claim 1, wherein said spool valve flow passages and said seal passages have triangular cross-sections.

3. The foam dispensing gun of claim 1, wherein said seal passages have triangular cross-sections.

4. The foam dispensing gun of claim 1, wherein said seal passages have polygonal cross-sections, with each of said seal-passage cross-sections having at least two intenor corners.

5. The foam dispensing gun of claim 1, wherein said seal passages have trapezoidal cross-sections.

6. The foam dispensing gun of claim 1, wherein said seal passages having defined leading edges and baselines which are spaced apart from each other, the baselines of said seal passages having widths that are greater than widths of said leading edges of said seal passages.

7. The foam dispensing gun of claim 1, wherein said spool valve is a metal valve and gun body portion is formed from plastic.

8. The foam dispensing gun of claim 1, wherein said gun body portion is injection molded and said seal passages are integrally formed therein during said molding.

9. The dispensing apparatus of claim 1, wherein said seal passages are aligned along a common datum line.

10. The dispensing apparatus of claim 1, wherein said seal passages are offset with respect to a common datum line.

11. A foam dispensing apparatus for dispensing a foam formed by mixing together two streams of reactive foam components, comprising:

a body portion in the shape of a gun having a handle extending therefrom for grasping by a user, a pair of inlet material connections for respectively connecting to two sources of reactive foam components, the inlet material connections having bores extending longitudinally therethrough, a valve seat formed in said body portion for receiving a valve member, the valve seat including integrally molded seal passages formed therein and oriented transverse thereto, said body portion having a pair of inlet passages defined therein that include said inlet material connections and extend longitudinally through said body portion between said inlet material connections and said valve seat, said body portion further including a pair of exit passages formed therein and spaced apart from and in opposition to said seat passages and aligned therewith, said exit passages in communication with a dispensing nozzle;

a spool valve disposed in said valve seat having a solid body portion and two flow passages formed therein extending through said solid body portion, the spool valve being rotatable in said valve seat and a trigger that is operatively connected to said spool valve, the trigger extending down from said body portion and being spaced apart therefrom, whereby, when a user of said dispenser squeezes said trigger toward said handle, said spool valve passages are bought into communication with said seal passages, thereby defining two paths so that foam components can travel from said inlet material connections to said nozzle; and, said spool valve passages having circular cross-sections and said seal passages having non-circular cross-sections.

12. The dispensing apparatus of claim 11, wherein said seal passages have triangular cross-sections.

13. The dispensing apparatus of claim 11, wherein said seal passages have trapezoidal cross-sections.

14. The dispensing apparatus of claim 11, wherein said seal passages have cross-sections in the shape of polygons having at least three interior corners.

15. The dispensing apparatus of claim 11, wherein said seal passages have leading edges that intersect first with said spool valve flow passages upon rotation of said spool valve by said trigger, said seal passages having variable widths that increase from said leading edges to baselines of said seal passages.

16. The dispensing apparatus of claim 11, wherein said seal passages have cross-sections chosen from the group consisting of: triangular cross-sections, rectangular cross-sections, trapezoidal cross-sections, horn cross-sections.

17. The dispensing apparatus of claim 11, wherein said seal passages are horizontally aligned along a common datum line.

18. The dispensing apparatus of claim 11, wherein said seal passages are offset with respect to a common datum line.

* * * * *